(12) United States Patent
Wada (10) Patent No.: US 7,565,035 B2
(45) Date of Patent: Jul. 21, 2009

(54) IMAGE PROCESSING METHOD, IMAGE PROCESSING APPARATUS AND IMAGE PROCESSING PROGRAM

(75) Inventor: Toshiaki Wada, Tama (JP)

(73) Assignee: Olympus Corporation, Tokyo (JP)

( * ) Notice: Subject to any disclaimer, the term of this patent is extended or adjusted under 35 U.S.C. 154(b) by 940 days.

(21) Appl. No.: 11/028,965

(22) Filed: Jan. 4, 2005

(65) Prior Publication Data

US 2005/0219608 A1    Oct. 6, 2005

(30) Foreign Application Priority Data

Jan. 15, 2004    (JP)    ............................. 2004-008190

(51) Int. Cl.
*G06K 9/60*    (2006.01)
*G06F 15/00*    (2006.01)

(52) U.S. Cl. ........................ 382/305; 382/232; 358/1.15

(58) Field of Classification Search ................. 382/167, 382/232, 233, 305; 358/1.15; 707/104.1
See application file for complete search history.

(56) References Cited

U.S. PATENT DOCUMENTS 5,713,022 A    1/1998    Yamashita

FOREIGN PATENT DOCUMENTS

JP    2002-197038    7/2002
JP    2002-229904    8/2002

OTHER PUBLICATIONS

Notification of Reasons for Rejection to Japanese Patent Application No. 2004-008190, mailed Mar. 4, 2008 (2 pgs.) with translation (3 pgs.).

*Primary Examiner*—Duy M Dang
(74) *Attorney, Agent, or Firm*—Straub & Pokotylo; John C. Pokotylo (57) ABSTRACT

An image-processing method to be performed in a server that can communicate with a terminal device. In the method, an original image from the terminal device is received, image-identifying data identifying the original image is stored in association with the original image, the image-identifying data is transmitted to the source from which the original image has been transmitted, a sample-image request is received from the terminal device, a prescribed process is performed on the original image, in response to the sample-image request, sample images smaller than the original image are formed by performing the prescribed process, process-identifying data identifying the process performed on the original image is stored, the sample images and the process-identifying data are transmitted to the terminal device, an image-process request including the image-identifying data and the process-identifying data is received, and an image identified by the image-identifying data and the process-identifying data is transmitted.

21 Claims, 12 Drawing Sheets

IMAGE PROCESSING METHOD, IMAGE PROCESSING APPARATUS AND IMAGE PROCESSING PROGRAM

CROSS-REFERENCE TO RELATED APPLICATIONS

This application is based upon and claims the benefit of priority from prior Japanese Patent Application No. 2004-008190, filed Jan. 15, 2004, the entire contents of which are incorporated herein by reference.

BACKGROUND OF THE INVENTION

1. Field of the Invention

The present invention relates to an image-processing technique that utilizes a network environment to provide service of correcting images.

2. Description of the Related Art

Users correct the images they have photographed with digital cameras by using, for example, PCs. In recent years cellular telephones and PDAs, each having a camera, have come into widespread use, rendering photographing easier. As photographing becomes easier, there are more chances of correcting images. Nevertheless, more and more users feel it tiresome to correct images, because they must acquire specific knowledge to do so.

In view of this, a system is proposed, in which a portable communications terminal transmits image data to an image processing apparatus and the apparatus processes the image data and transmits the data processed back to the portable communications terminal. (See Jpn. Pat. Appln. KOKAI Publication 2002-197038.)

BRIEF SUMMARY OF THE INVENTION

An image-processing method according to a first aspect of this invention is to be performed in a server that can communicate with a terminal device. The method comprises: receiving an original image from the terminal device; storing image-identifying data identifying the original image, in association with the original image; transmitting the image-identifying data to the source from which the original image has been transmitted; receiving a sample-image request from the terminal device; performing a prescribed process on the original image, in response to the sample-image request; forming sample images from an image generated by performing the prescribed process, the sample images being smaller than the original image; storing process-identifying data identifying the process performed on the original image, in association with the original image; transmitting the sample images and the process-identifying data to the terminal device; receiving, from the terminal device, an image-process request including the image-identifying data and the process-identifying data; and transmitting an image generated by performing a process on the original image identified by the image-identifying data, the process being one identified by the process-identifying data.

An image-processing apparatus according to the first aspect of the invention can communicate with a terminal device. The apparatus comprises: an image-receiving unit which receives an original image from the terminal device; an image-storing unit which stores storing image-identifying data identifying the original image, in association with the original image; an image-identifying data transmitting unit which transmits the image-identifying data to the terminal device; a sample-image request receiving unit which receives a sample-image request from the terminal device; a sample-image forming unit which performs a prescribed process on the original image, in response to the sample-image request, and which forms sample images which are smaller than the original image; a process-data storing unit which stores process-identifying data identifying the process performed on the original image, in association with the original image; a sample-image transmitting unit which transmits the sample images and the process-identifying data to the terminal device; an image-process request receiving unit which receives, from the terminal device, an image-process request including the image-identifying data and the process-identifying data; and a processed-image transmitting unit which transmits an image generated by performing a process on the original image identified by the image-identifying data, the process being one identified by the process-identifying data.

An image-processing program according to this invention is to be executed in an image-processing apparatus that can communicate with a terminal device. The program causes a computer to perform the following processes: a process of receiving an original image from the terminal device; a process of storing image-identifying data identifying the original image, in association with the original image; a process of transmitting the image-identifying data to the source from which the original image has been transmitted; a process of receiving a sample-image request from the terminal device; a process of performing a prescribed process on the original image, in response to the sample-image request; a process of forming sample images from an image generated by performing the prescribed process, the sample images being smaller than the original image; a process of storing process-identifying data identifying the process performed on the original image, in association with the original image; a process of transmitting the sample images and the process-identifying data to the terminal device; a process of receiving, from the terminal device, an image-process request including the image-identifying data and the process-identifying data; and a process of transmitting an image generated by performing a process on the original image identified by the image-identifying data, the process being one identified by the process-identifying data.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described, with reference to the accompanying drawings.

Figure 1:
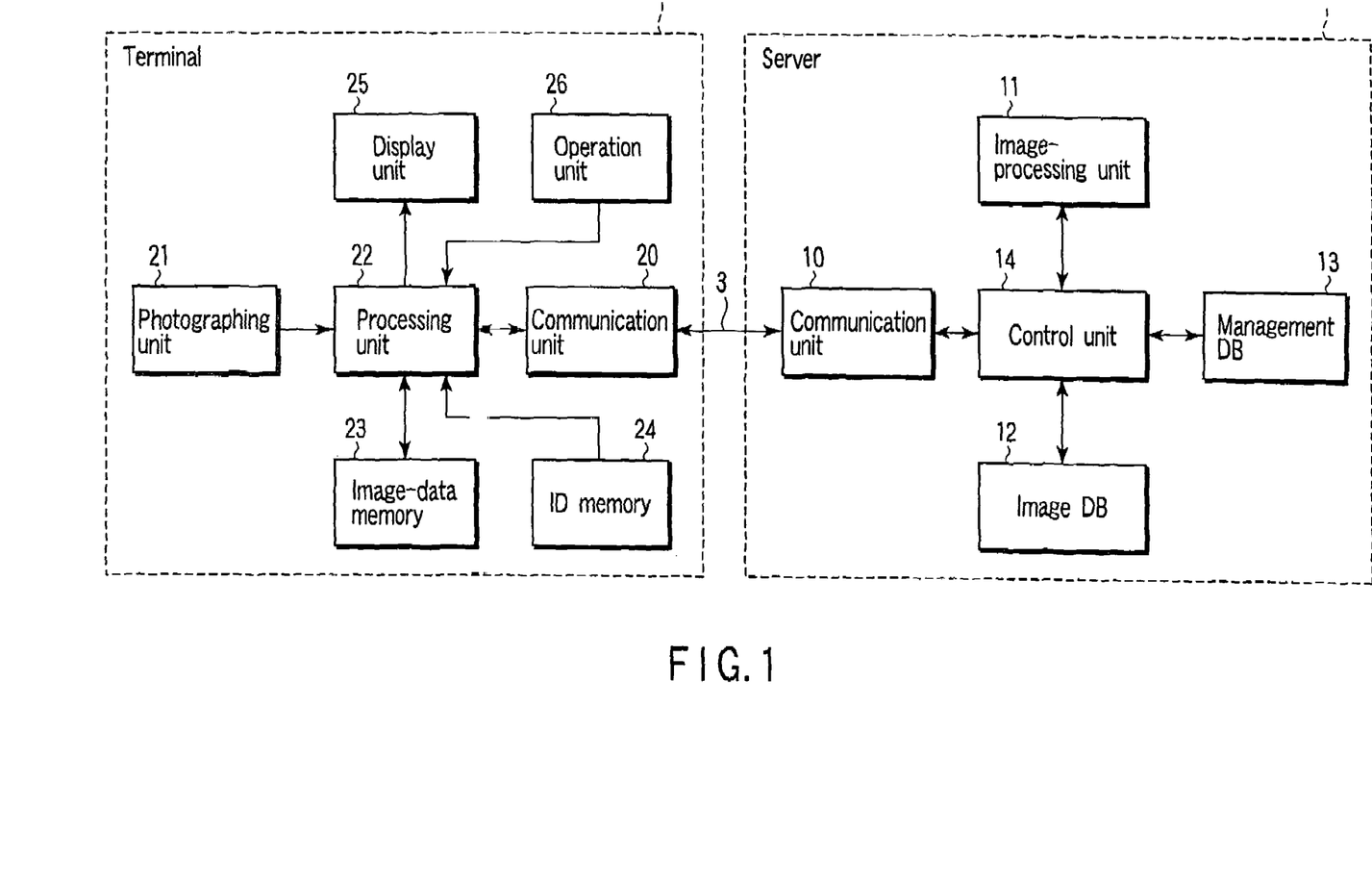
FIG. 1 is a diagram showing the configuration of an image processing system to which an image processing method according to a first embodiment of the invention is applied.

FIG. 1 is a diagram showing the configuration of an image processing system to which an image processing method according to a first embodiment of the invention is applied.

The image processing system comprises a server 1, a terminal 2, and a communications line 3 connecting the server 1 and terminal 2. The server 1 is a data-processing server owned by a provider who offers image-processing service. The terminal 2 is a data-processing terminal owned by a user who wants to receive the image-processing service. The server 1 receives image data from the terminal 2 trough the communication line 3, performs a prescribed process on the image data and transmits the image data back to the terminal 2.

The server 1 comprises a communications unit 10, an image-processing unit 11, an image DB 12, a management DB 13, and a control unit 14.

The communications unit 10 is an interface that achieves data exchange with the terminal 2. The image-processing unit 11 processes image data. That is, it performs the image processing method according to the first embodiment of the invention. The management DB 13 stores management data relating to the image data stored in the image DB 12. The control unit 14 controls the other components of the server 1.

The terminal 2 comprises a communications unit 20, a photographing unit 21, a processing unit 22, an image-data memory 23, an ID memory 24, a display unit 25, and an operation unit 26.

The communications unit 20 is an interface that achieves data exchange with the server 1. The photo-graphing unit 21 acquires an optical image of an object and converts the image into image data. The processing unit 22 processes the image data and controls the other components of the terminal 2. The image-data memory 23 stores the image data the processing unit 22 has processed. The ID memory 24 stores the ID data items that identify the terminal 2 and the user of the terminal 2. The display unit 25 displays the images stored in the terminal 2, and photograph information, and the like. The operation unit 26 receives instructions input by the user and outputs the instructions to the processing unit 22.

The communications line 3 is a path of the type widely used in transmitting and receiving data. It accomplishes wired communication using a conductive wire, an optical fiber or the like, or wireless communication using light, sound waves or electric waves.

Figure 2:
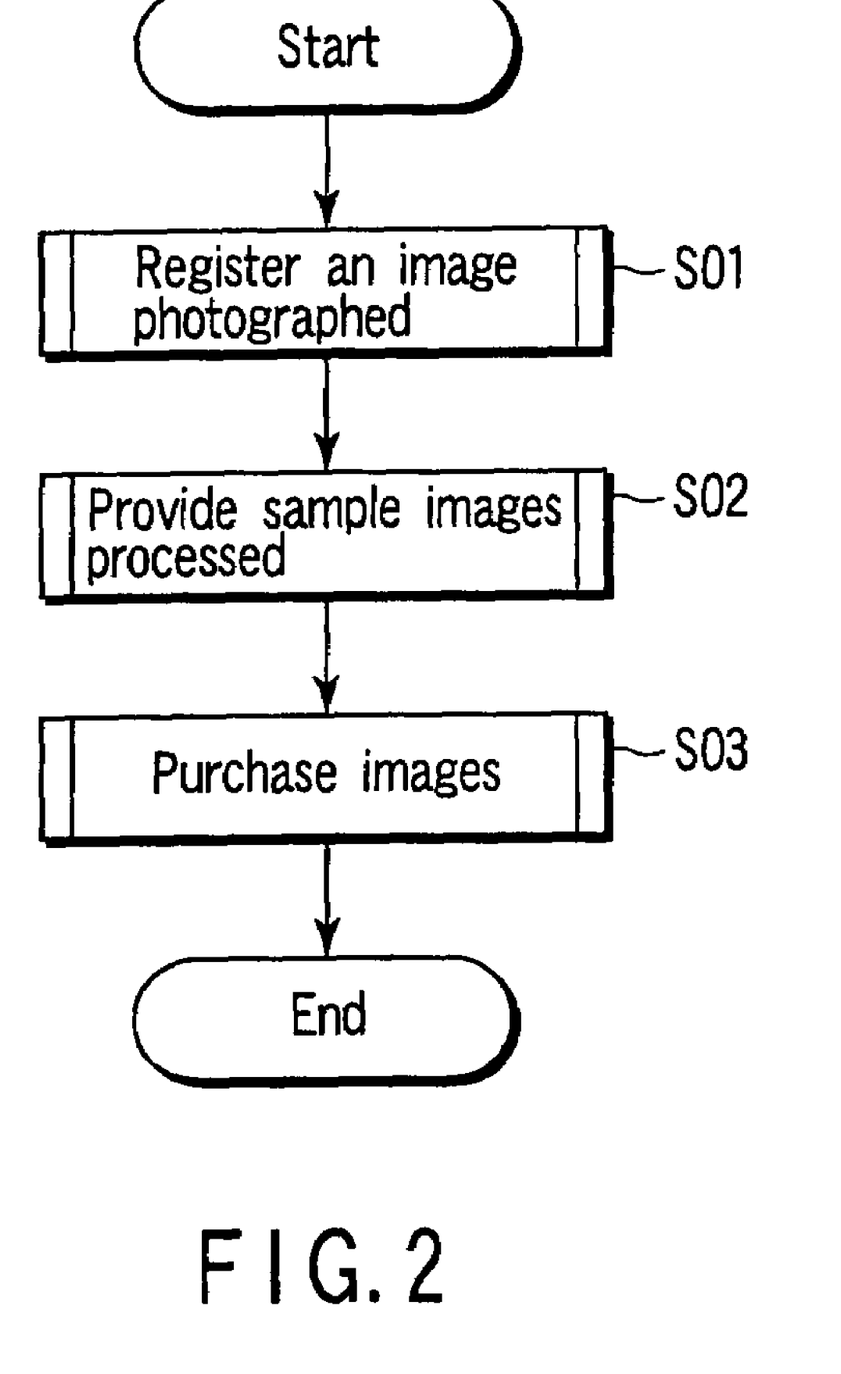
FIG. 2 is a flowchart outlining a procedure of processing an image in the image processing method according to the first embodiment.

FIG. 2 is a flowchart outlining a procedure of processing an image in the image processing method according to the first embodiment. Assume that the user, who wants to receive image-processing service, has entered into a contract with the provider so that he or she may receive the service from the provider.

Figure 3:
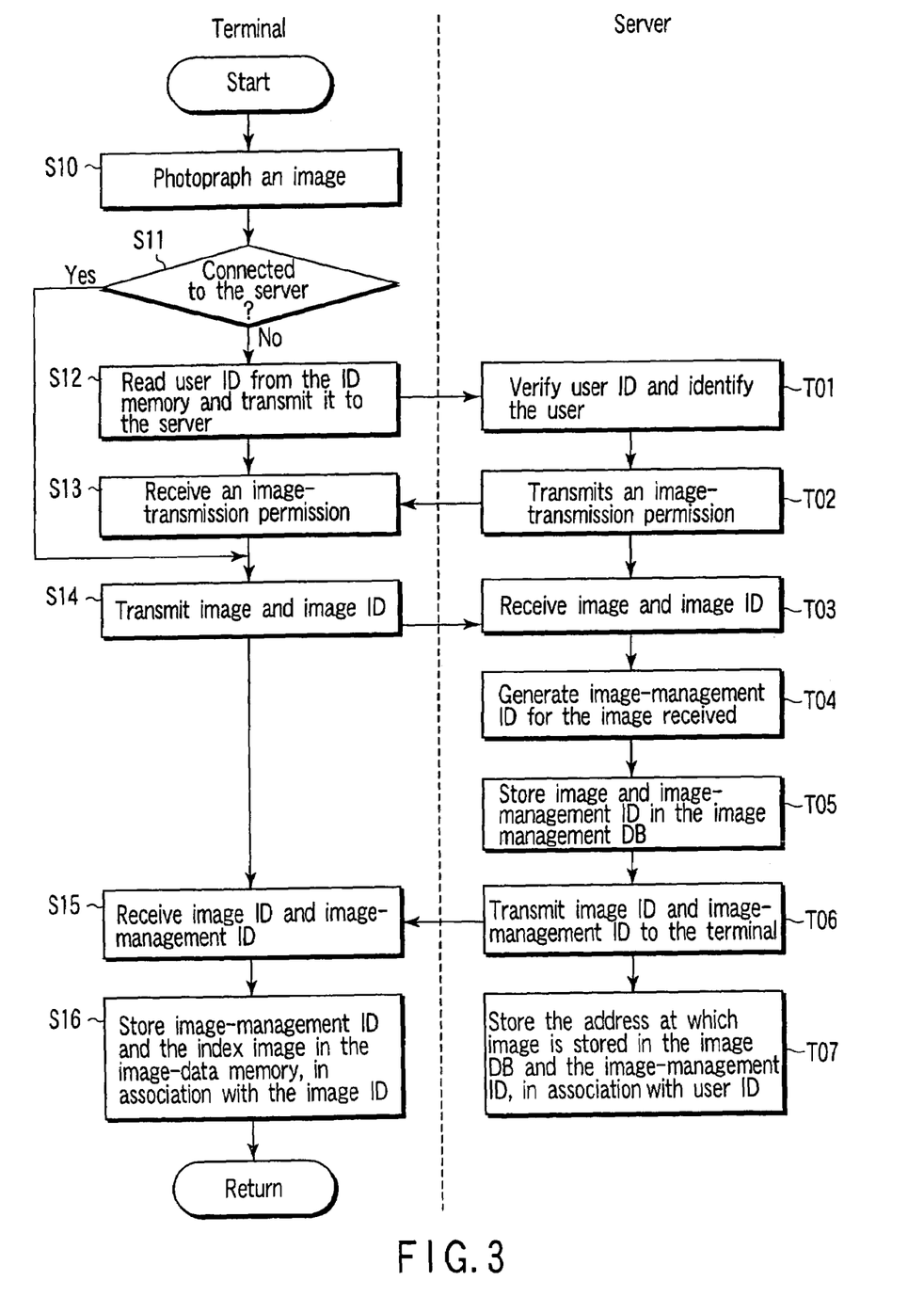
FIG. 3 is a flowchart outlining a procedure of registering an image photographed.

First, Step S01 of registering an image photographed will be described. FIG. 3 is a flowchart that outlines the procedure of registering the image.

In Step S10, the user operates the operation unit 26 after photographing an image. In Step S11, it is determined whether the terminal 2 is connected to the server 1.

If No in Step S11, or if the terminal 2 is not connected to the server 1, the user ID is read from the ID memory 24 and is transmitted the user ID to the server 1 in Step S12.

In Step T01, the control unit 14 of the server 1 verifies the user ID received, and determines that the user has made a contract with the provider. In Step T02, an image-transmission permission is transmitted to the terminal 2 of the user thus identified.

In Step S13, upon receipt of the image-transmission permission the processing unit 22 determines that the terminal 2 is connected to the server 1. Subsequently, the unit 22 performs Steps S14 et seq.

If Yes in Step S11, that is, if the terminal 2 is connected to the server 1, the processing unit 22 transmits image data and an image ID that identifies this image data to the server 1.

In Step T03, the control unit 14 receives the image data and the image ID. In Step T04, the control unit 14 generates an image-management ID that is information for managing the image data received. In Step T05, the control unit 14 stores the image data and the image ID into the image DB 12. In Step T06, the control unit 14 transmits the image ID and the image-management ID to the terminal. In Step T07, the control unit 14 stores the address of the image DB 12, where the image data is stored, and the image-management ID, into the management DB 13. In the management DB 13, the address and the image-management ID are associated with the user ID.

In the terminal 2, the processing unit 22 receives the image ID and the image-management ID in Step S15. In Step S16, the image-management ID and the index image (thumbnail image) are stored in the image-data memory 23, in association with the image ID. Then, the process returns.

Figure 4:
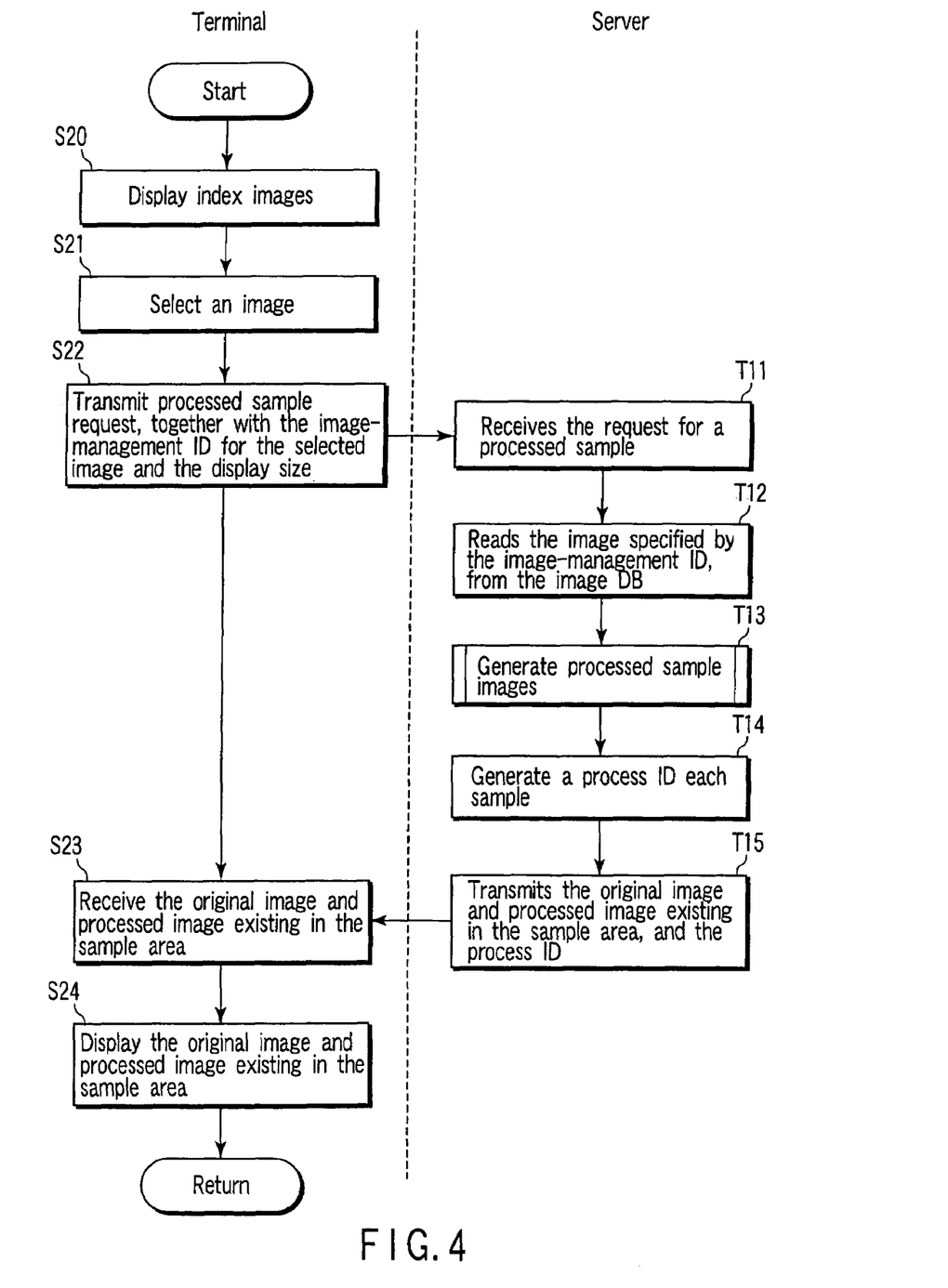
FIG. 4 is a flowchart outlining a procedure of providing a sample processed.

A process of providing processed samples, i.e., Step S02 shown in FIG. 2, will be explained. FIG. 4 is a flowchart outlining a procedure of providing a sample processed.

In the terminal 2, the display unit 25 displays the index images stored in the image-data memory 23. This prompts the user to select the images he or she wants.

When the user selects an image in Step S21, the terminal transmits a request for a processed sample to the server 1, together with the image-management ID and "display size" in step S22. The "display size" is data that represents the display-screen size of the terminal 2. If the terminal 2 is a cellular telephone, this data represents the size of the liquid crystal display provided on the telephone.

In the server 1, the control unit 14 receives the request for a processed sample in Step T11. In Step T12, the control unit 14 reads the image specified by the image-management ID, from the image DB. The control unit 14 then activates the image-processing unit 11.

The image-processing unit 11 performs Step T13, i.e., a step of generating processed sample images. The image-processing unit 11 carries out various corrections, such as brightness correction, color correction, sharpness correction and red-eye correction.

Figure 5:
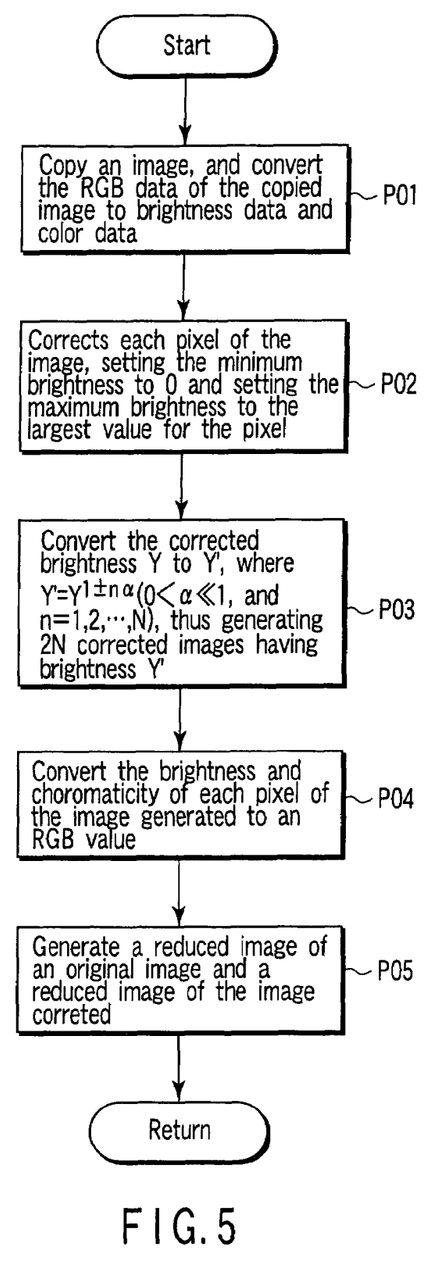
FIG. 5 is a flowchart outlining a procedure of correcting brightness.

FIG. 5 is a flowchart outlining a procedure of brightness correction, which is one of the processes performed to generate processed sample images.

In Step P01, the image-processing unit 11 copies an image that has been specified and then converts the RGB data of the copied image to brightness data and chromaticity data. In Step P02, the unit 11 corrects each pixel of the image, setting the minimum brightness to 0 and setting the maximum brightness to the largest value that the pixel can have.

In Step P03, the corrected brightness Y is converted to new brightness Y' as indicated by the following equation (1), thus generating a corrected image having the new brightness Y':

$$Y' = Y^{1 \pm n\alpha} \quad (1)$$

where $0 < \alpha << 1$, and $n = 1, 2, \ldots, N$.

This conversion brings forth 2N corrected images.

In Sep P04, the brightness and chromaticity of each pixel of the image generated are converted to an RGB value. In Step P05, a reduced image of an original image and a reduced image of the image corrected are generated. Then, the process returns.

Figure 6:
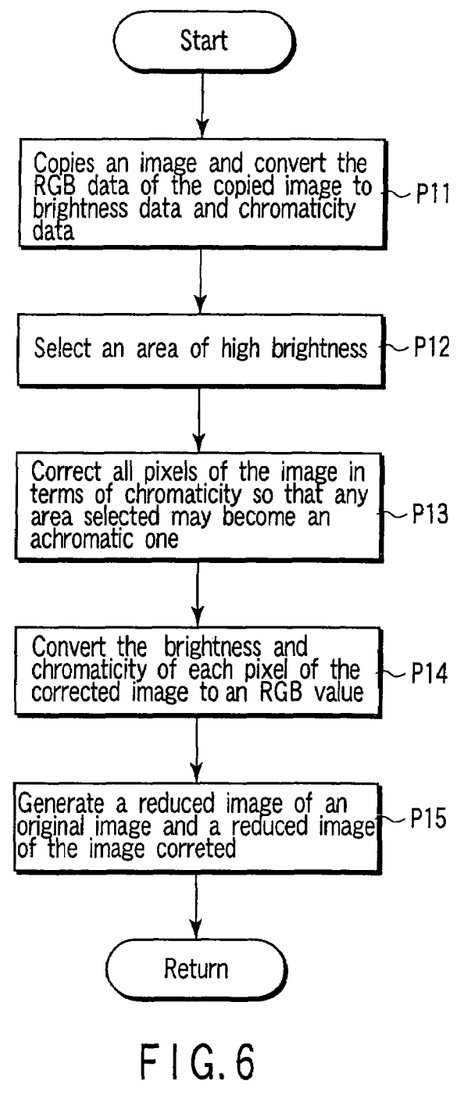
FIG. 6 is a flowchart outlining another procedure of color correction.

FIG. 6 is a flowchart outlining a procedure of color correction, which is another process performed to generate processed sample images.

In Step P11, the image-processing unit 11 copies an image that has been specified and then converts the RGB data of the copied image to brightness data and chromaticity data. In Step P12, an area of high brightness is detected. The number of areas to be selected is not limited to one. That is, a plurality of areas may be selected.

In Step P13, all pixels of the image are corrected in terms of chromaticity so that any area selected may become an achromatic one. In Step P14, the brightness and chromaticity of each pixel of the corrected image are converted to an RGB value. In Step P15, a reduced image of an original image and a reduced image of the image corrected are generated. The process then returns.

Figure 7:
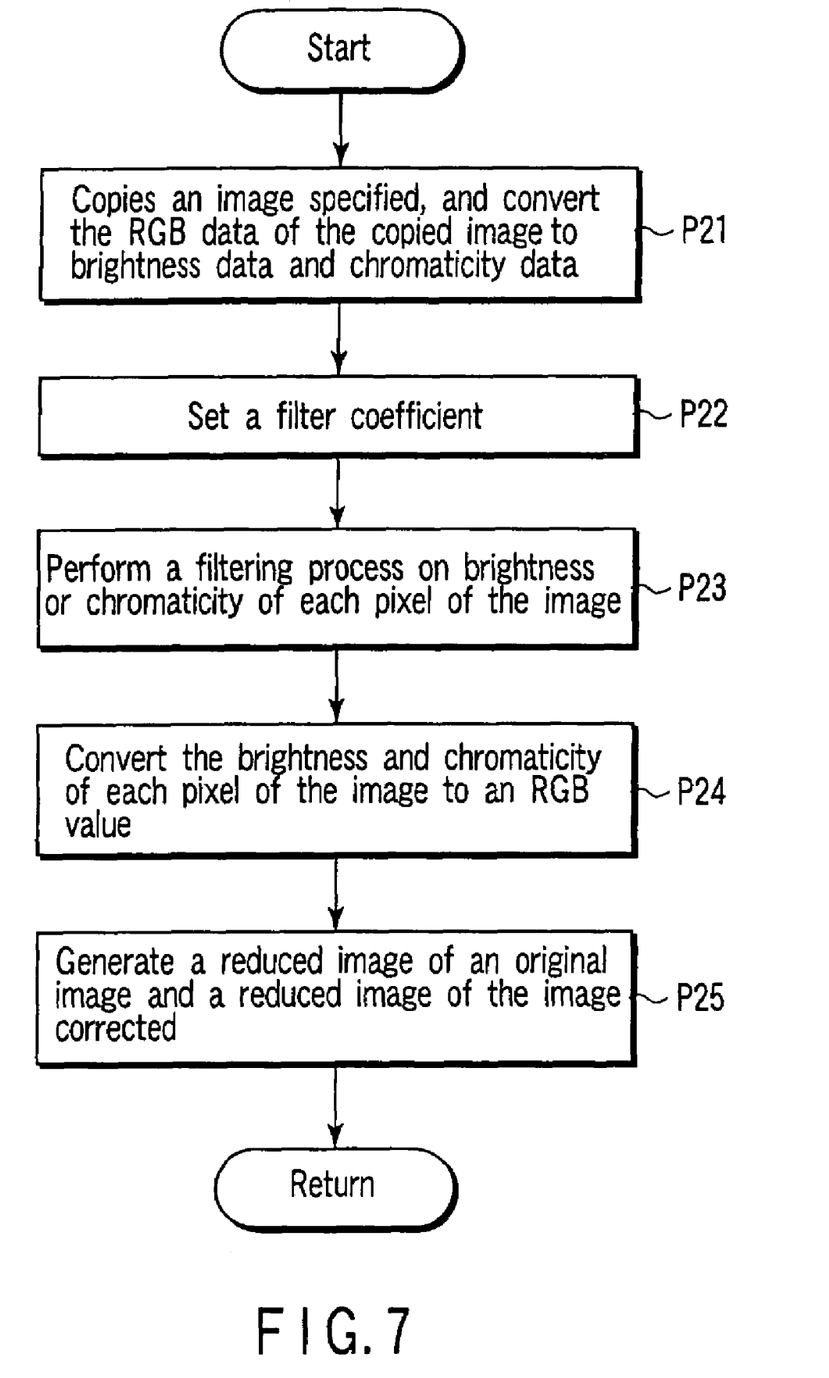
FIG. 7 is a flowchart outlining a procedure of adjusting sharpness.

FIG. 7 is a flowchart outlining a procedure of adjusting sharpness, which is still another process performed to generate processed sample images.

In Step P21, the image-processing unit 11 copies an image that has been specified and then converts the RGB data of the copied image to brightness data and chromaticity data. In Step P22, a filter coefficient is set. The number of filter coefficients to be set is not limited to one. That is, a plurality of filter coefficients may be selected.

In Step P23, a filtering process is performed on brightness or chromaticity of each pixel of the image. In Step P24, the brightness and chromaticity of each pixel of the image are converted to an RGB value. In Step P25, a reduced image of an original image and a reduced image of the image corrected are generated. The process then returns.

Figure 8:
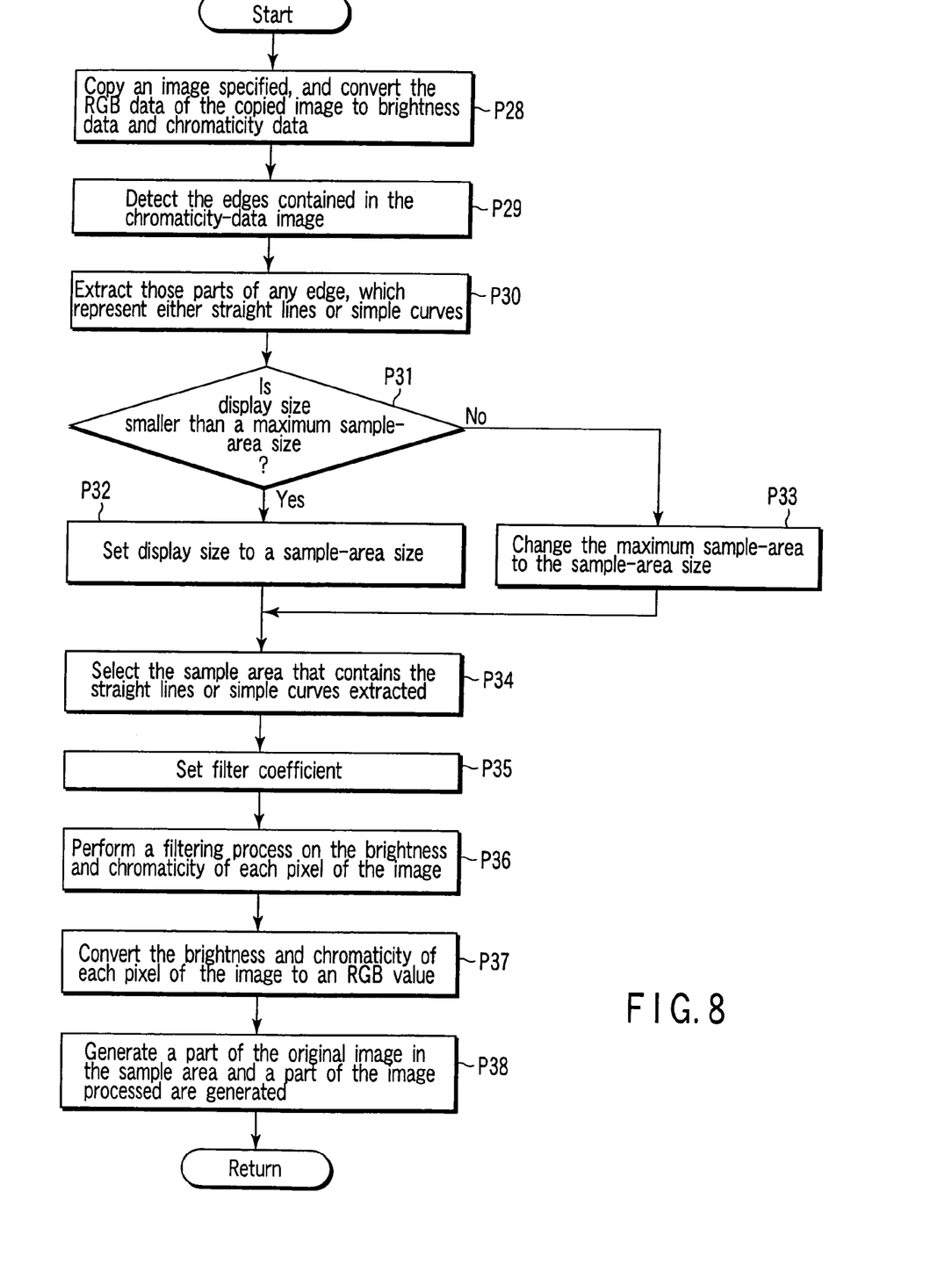
FIG. 8 is a flowchart illustrating another procedure of adjusting sharpness.

FIG. 8 is a flowchart illustrating another procedure of adjusting sharpness, which is another process performed to generate processed sample images.

In Step P28, the image-processing unit 11 copies an image that has been specified and then converts the RGB data of the copied image to brightness data and chromaticity data. In Step P29, the edges contained in the chromaticity-data image are detected. In Step P30, those parts of any edge, which represent either straight lines or simple curves, are extracted.

In Step P31, it is determined whether the "display size" transmitted from the terminal 2 is smaller than a maximum sample-area size that has been predetermined. The maximum sample-area size is the largest size that sample images generated in this process may have.

If Yes in Step P31, that is, if the "display size" is smaller than the maximum sample-area size, the process goes to Step P32. In Step P32, the "display size" is set to a sample-area size that will be used in subsequent processes. If No in Step P31, that is, if the "display size" is larger than the maximum sample-area size, the process goes to Step P33. In Step P33, the maximum sample-area is changed to the sample-area size that will be used in the subsequent processes.

In Step P34, the sample area is selected, which contains the straight lines or simple curves extracted.

In Step P35, a filter coefficient is set. The number of filter coefficients to be set is not limited to one. A plurality of filter coefficients may be selected.

In Step P36, a filtering process is performed on the brightness and chromaticity of each pixel of the image, for each filter coefficient set. In Step P37, the image-processing unit 11 converts the brightness and chromaticity of each pixel of the image to an RGB value. In Step P38, a part of the original image in the sample area and a part of the image processed are generated. The process then returns.

In the sharpness adjustment described above and illustrated in FIG. 7, the filtering process is performed on the entire image. In the sharpness adjustment shown in FIG. 8, those edges contained in the chromaticity-data image, which are easy to confirm, are detected, and the sample area containing these edges is processed into a sample. The sharpness adjustment of FIG. 8 differs in this respect.

The filtering process and the process of generating a part of the image, both shown in FIG. 8, can be utilized to emphasize the edges. In this case, the filtering is carried out, only on the edges extracted.

Figure 9:
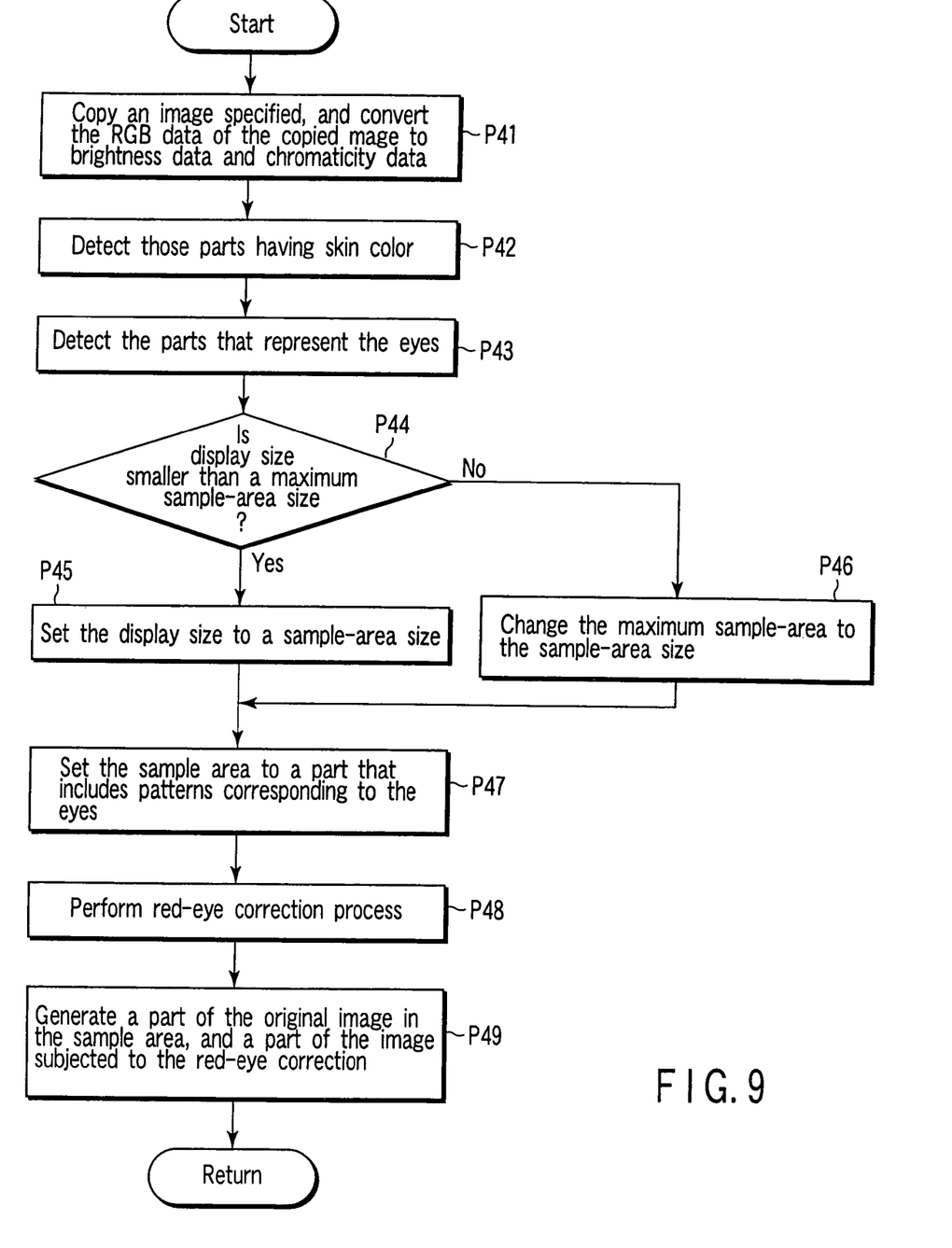
FIG. 9 is a flowchart illustrating a red-eye correction procedure.

FIG. 9 is a flowchart illustrating a red-eye correction procedure, which is another process performed to generate processed sample images.

In Step P41, the image-processing unit 11 copies an image that has been specified and then converts the RGB data of the copied image to brightness data and chromaticity data. In Step P42, those parts of the chromaticity-data image, which have skin color, are detected. In Step P43, the parts that represent eyes from the parts detected are extracted.

In Step P44, it is determined whether the "display size" transmitted from the terminal 2 is smaller than a maximum sample-area size that has been predetermined. The maximum sample-area size is the largest size that sample images generated in this process may have.

If Yes in Step P44, that is, if the "display size" is smaller than the maximum sample-area size, the process goes to Step P45. In Step P45, the "display size" is set to a sample-area size that will be used in the subsequent processes. If No in Step P44, that is, if the "display size" is larger than the maximum sample-area size, the process goes to Step P46. In Step P46, the maximum sample-area is changed to the sample-area size that will be used in the subsequent processes.

In Step P47, the sample area is set to a part that includes patterns corresponding to the eyes. In Step P48, a red-eye correction process is carried out. The red-eye correction process may be of the technique known in the art. In this correction process, different process parameters may be applied, to perform a plurality of red-eye correction processes.

In Step P49, the unit 11 generates a part of the original image in the sample area, and a part of the image subjected to the red-eye correction. The process then returns.

To generate processed a sample image, any one of the processes shown in FIGS. 5 to 9 may be performed, or all these processes may be carried out. Alternatively, some of these processes may be selected and performed. Further, any of these processes may be selected on a specific logical basis.

As shown in FIG. 4, the control unit 14 generates, in Step T14, a process ID that identifies a sample generated in the step of generating processed sample images. In Step S15, the process ID is transmitted to the terminal 2, together with the original image and processed image existing in the sample area.

In the terminal 2, the original image and processed image existing in the sample area are received in Step S23. In Step S24, the display unit 25 displays the original image and the processed image.

Figure 10:
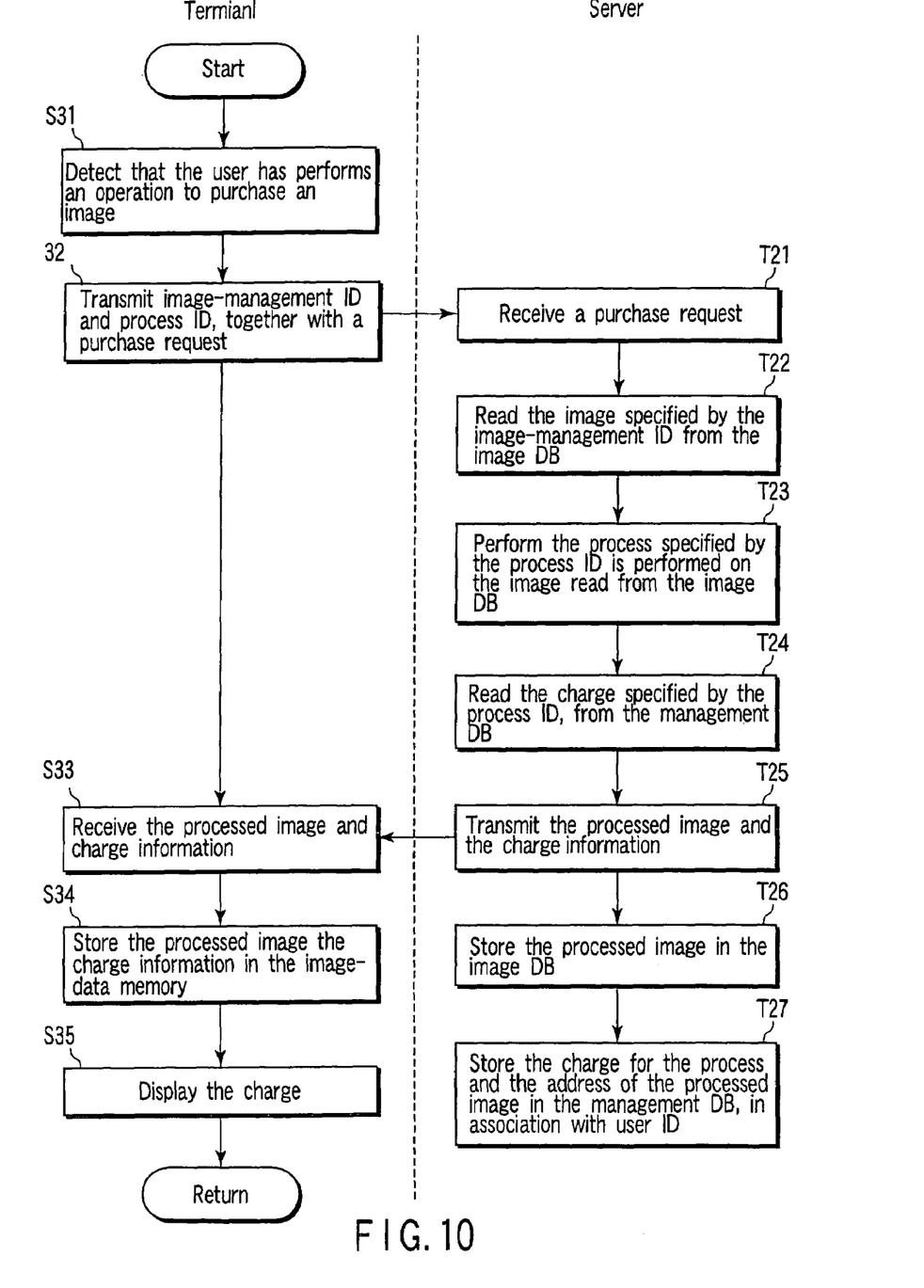
FIG. 10 is a flowchart outlining a procedure of purchasing images.

Step S03 shown in FIG. 2, i.e., a process of purchasing images, will be explained. FIG. 10 is a flowchart outlining the procedure of purchasing images.

The user looks at the processed sample images the display unit 25 displays and selects any processed image desired, in order to purchase the processed image. The user may operate the operation unit 26 to switch the display screen to another, so that the original image or each processed sample image may be displayed.

In Step S31 it is detected that the user has performs an operation to purchase a specific image. Then, in Step S32, the processing unit 22 transmits a purchase request to the server 1, along with the image-management ID and process ID which pertain to the processed sample image selected.

In the server 1, the control unit 14 receives the purchase request in Step T21. In Step T22, the unit 14 reads the image specified by the image-management ID from the image DB 12. In Step T23, the process specified by the process ID is performed on the image read from the image DB 12.

In Step T24, the charge specified by the process ID is read from the management DB 13. In Step T25, the processed image and the charge information are transmitted to the terminal 2. In Step T26, the processed image is stored in the image DB 12 so that it may be transmitted in response to a re-transmission request. In Step T27, the charge for the process and the address of the processed image are stored in the management DB 13, in association with the user ID.

The terminal 2 receives the processed image and the charge information from the server 1 in Step T33. In Step T34, processed image and the charge information are stored in the image-data memory 23. In Step T35, the display unit 25 displays the processed image. Then, the process returns.

In this embodiment, in Step T23, the server 1 receives a purchase request and performs the process corresponding to the process ID, on the original image. In Step T26, the image processed is stored in the image DB 12. The invention is not limited to this embodiment, nevertheless. In Step S02, i.e., the step of providing sample images processed, the sample images formed may be stored in the image DB 12, in association with the process ID.

In the image processing method according to the first embodiment, the user may transmit a photographed image to the server 1. The sever 1 correct a part of the image. The image thus corrected is transmitted as a sample from the server 1 to the terminal 2. The user observes the corrected image and may be satisfied with the partly corrected image. Then, the user purchases the service, receiving the image corrected in its entirety.

Hence, it is unnecessary for the user to perform complicated image-correction that requires professional skill. He or she needs only to select whichever image-correcting method he or she likes. Not the entire processed image, but only a part thereof or a reduced version thereof, is transmitted. Therefore, the data representing the image is small and can be transmitted in a short time.

A modification of the first embodiment will be described.

Figure 11:
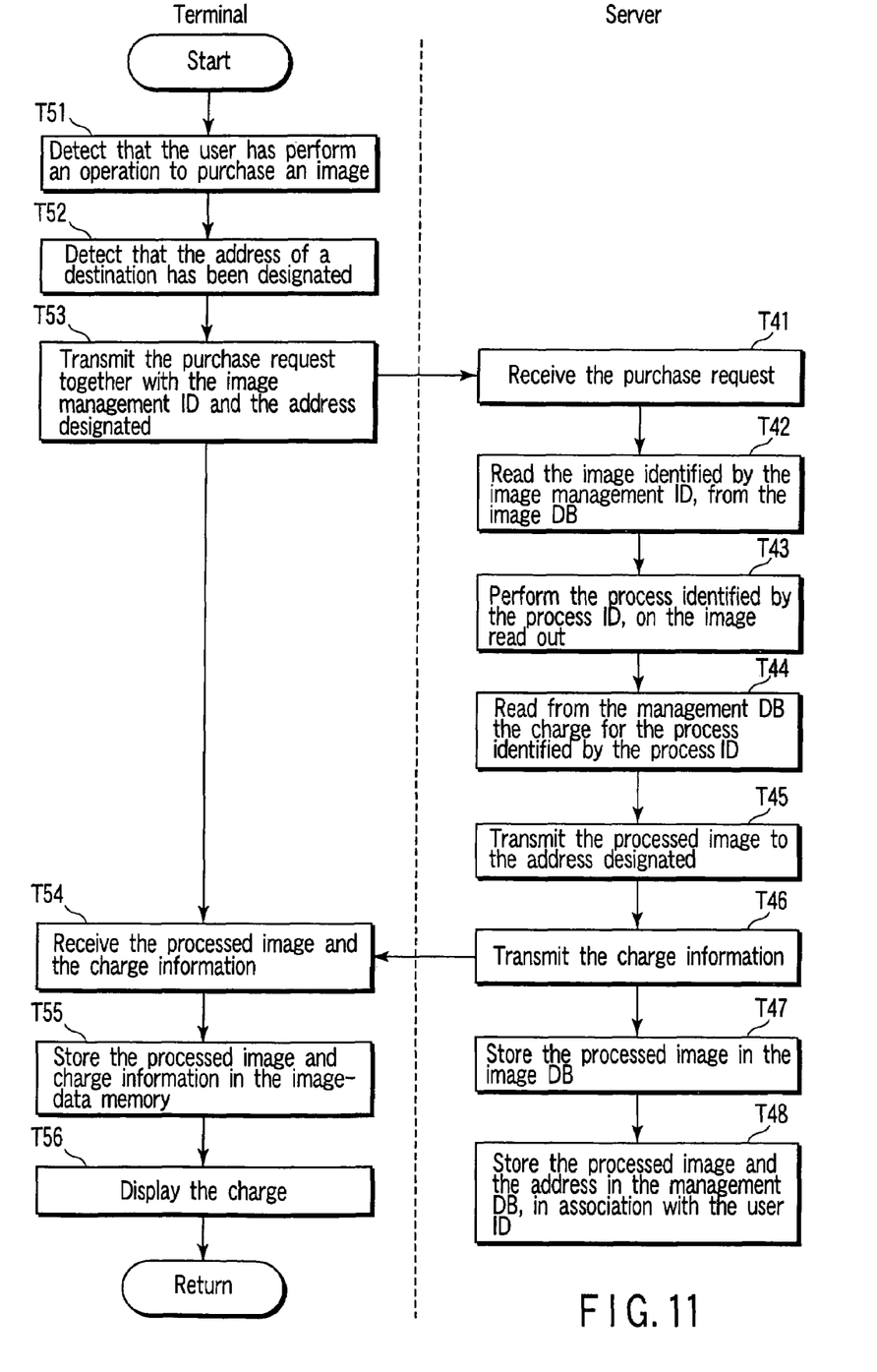
FIG. 11 is a flowchart outlining a process of purchasing images, which is performed in a modified embodiment.

The modification differs in the process of purchasing images, i.e., Step S03. FIG. 11 is a flowchart outlining a process of purchasing images, which is performed in a modification of the first procedure of the first embodiment.

Looking at the processed sample images displayed by the display unit 25, the user selects one image that he or she wants, in order to purchase the image. The user may operate the operation unit 26 to switch the display screen to another, so that the original image or the processed sample image may be displayed.

In Step S51, it is detected that an image has been selected. In Step S52, it is detected that the address of a destination to which processed image should be transmitted has been designated. Then, in Step S53, the processing unit 22 transmits a purchase request to the server 1, along with the image-management ID and process ID that corresponds to the processed sample image that has been selected.

In the server 1, the control unit 14 receives the purchase request in Step T41. In Step T42, the image specified by the image-management ID is read from the image DB 12. In Step T43, the process specified by the process ID is performed on the image read from the image DB 12.

In Step T44, the charge for the process specified by the process ID is read from the management DB 13. In Step T45, the processed image is transmitted to the address designated. In Step T46, the charge information is transmitted to the terminal 2. In Step T47, the processed image is stored in the image DB 12. In Step T48, the processed image is stored in the management DB 13, in association with the user ID and the address at which the processed image has been stored.

In the terminal 2, the processed image and the charge information, both transmitted from the server 1, are stored in the image-data memory 23. The display unit 25 displays the processed image and the process charge. The process then returns. Thus, the image processing is completed in the present embodiment.

In the image processing method according to the modification, a processed image is transmitted, not to the side that has transmitted a purchase request for the image, but to the address specified. Only the process-charge information is transmitted to the side that has transmitted the purchase request.

In Step S51, it may be detected not that a purchase of a processed image has been designated, but that an order for printing the processed image has been placed. (The order designates size in which to print the image and the number of copies to be printed.) In Step S52, it may be detected that the destination to which the printed image should be transmitted has been designated, and in Step T45, the processed image, print-order information and destination information are transmitted to the address of the printing server. In this case, the prints of the processed image are bought.

In addition to the advantages of the first embodiment, data can be transmitted in a shorter time because the processed image need not be transmitted or received. Further, an order for printing the processed image can be placed.

Figure 12:
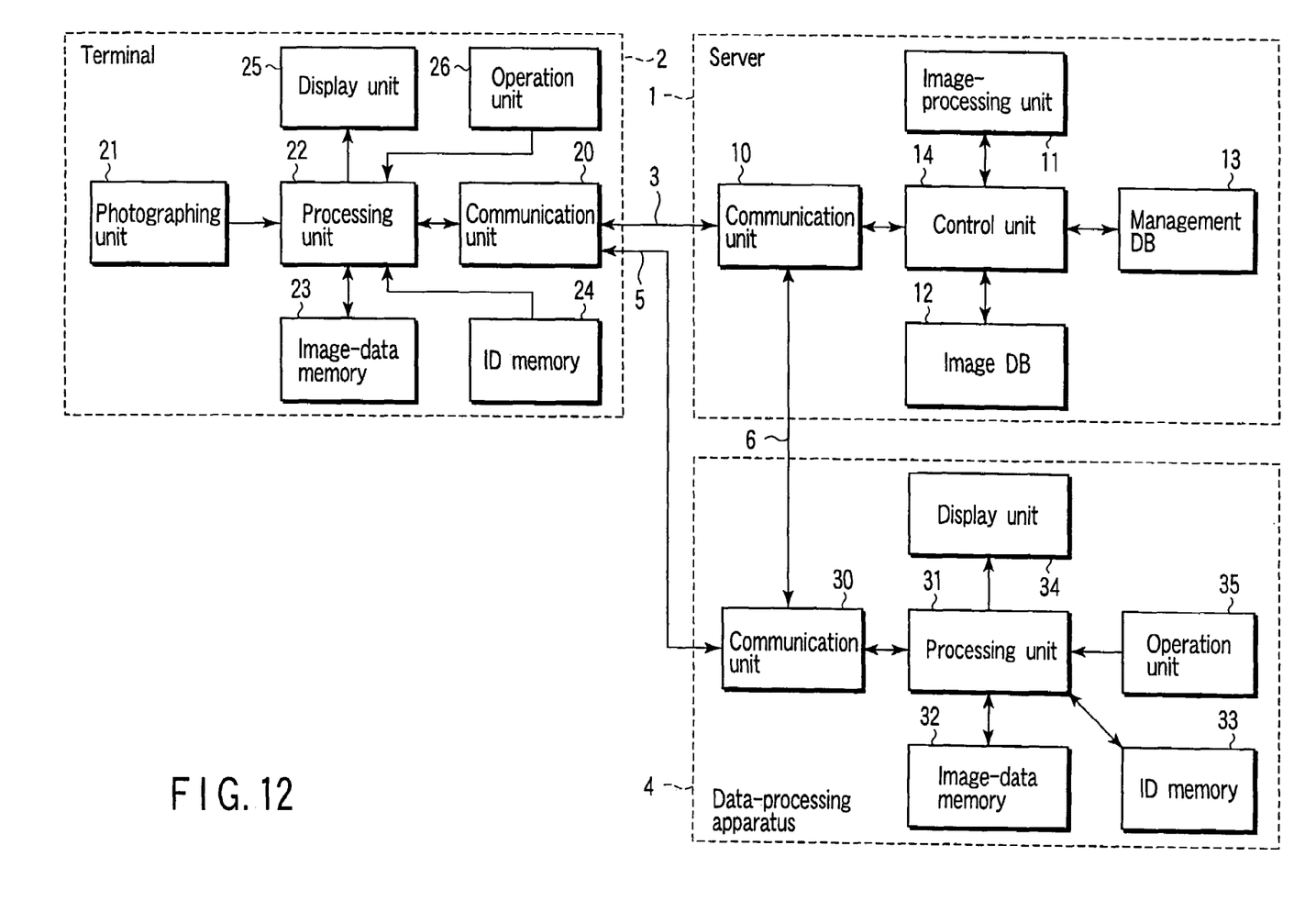
FIG. 12 is a diagram showing an image processing system to which an image-processing method according to a second embodiment of the invention is applied.

FIG. 12 is a diagram showing an image processing system to which an image-processing method according to the second embodiment of the invention is applied.

The image processing system comprises a server 1, a terminal 2, a data-processing apparatus 4, and communications lines 3, 5 and 6. This image processing system is identical to the image processing system of FIG. 1, except that the data-processing apparatus 4 is used and the communications lines 5 and 6 are provided between the server 1 and the terminal 2.

Hence, the components identical to those shown in FIG. 1 are designated at the same reference numerals and will not be described in detail.

The data-processing apparatus 4 comprises a communications unit 30, a processing unit 31, an image-data memory 32, an ID memory 33, a display unit 34, and an operation unit 35.

The communications unit 30 is an interface that performs information exchange between the server 1 and the terminal 2. The processing unit 31 controls the other components of the data-processing apparatus 4. The image-data memory 32 stores the image data transmitted from the server 1 and terminal 2. The ID memory 33 stores the ID data that identifies the user and the data-processing apparatus 4. The display unit 34 displays the image data and the like stored in the data-processing apparatus 4. The operation unit 35 receives instructions input by the user and outputs the instructions to the processing unit 31.

The communications lines 5 and 6 are paths of the type widely used in transmitting and receiving data. It accomplishes wired communication using a conductive wire, an optical fiber or the like, or wireless communication using light, sound waves or electric waves.

The operation of the image processing system will be described.

Figure 13:
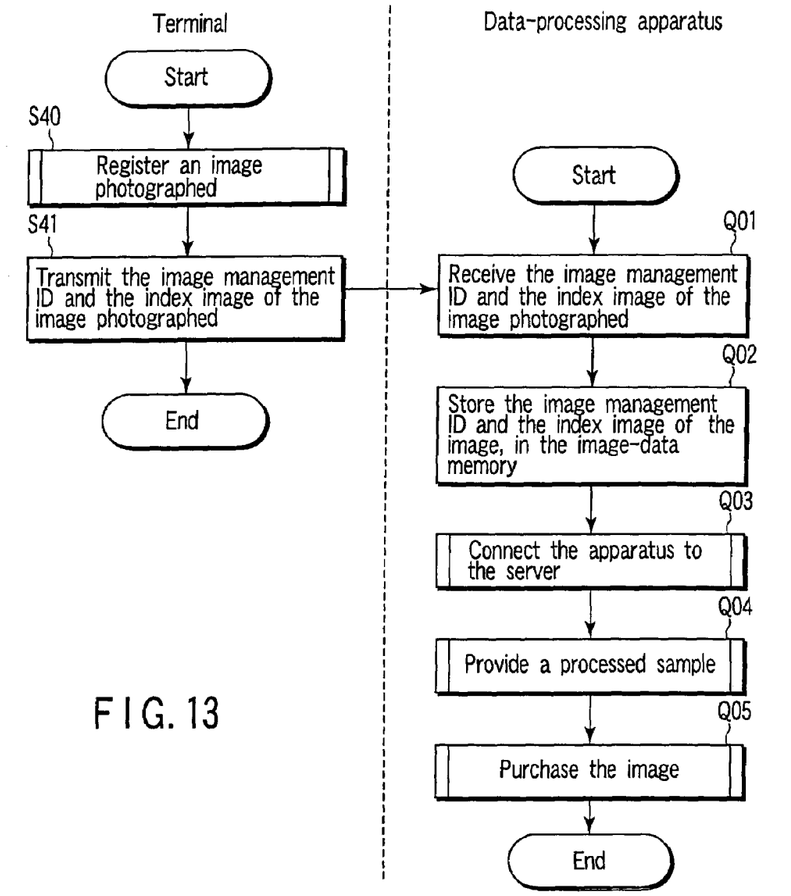
FIG. 13 is a flowchart outlining a sequence of processes, some performed in a terminal and the others performed in a data-processing apparatus.

FIG. 13 is a flowchart that outlines a sequence of processes, some performed in the terminal 1 and the others performed in the data-processing apparatus 4. Assume that the user, who wants to receive image-processing service, has entered into a contract with the provider so that he or she may receive the service from the provider.

In Step S40, the terminal 2 performs the process of registering an image photographed. This process will not be explained because it is identical to the image-registering process illustrated in FIG. 3. In Step S41, the terminal 2 transmits the image-management ID and the index image of the image stored in the server 1 and designated by the image-management ID, to the data-processing apparatus 4.

In the data-processing apparatus 4, the processing unit 31 receives the image-management ID and the index image in Step Q01. In Step Q02, the image-management ID and the index image are stored in the image-data memory 32. In Step Q03, a process of connecting the apparatus 4 to the server 4 is carried out, as will be described with reference to FIG. 14.

Figure 14:
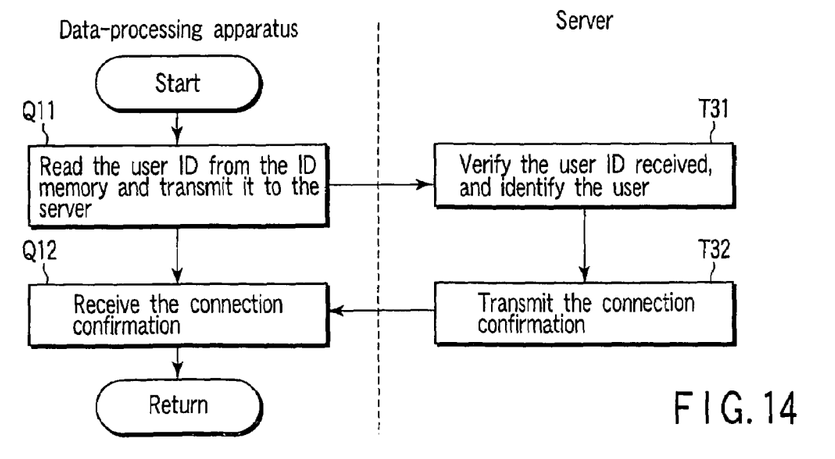
FIG. 14 is a flowchart outlining a procedure of carrying out connection to a sever.

In Step Q11 shown in FIG. 14, the processing unit 31 reads the user ID from the ID memory 33 and transmits the user ID to the server 1.

In the server 1, the control unit 14 verifies the user ID in Step T31. In Step S32, the unit 14 confirms that the user has entered into the contract. The unit 14 then transmits a connection confirmation to the terminal 2 of the user.

The terminal 2 receives the connection confirmation in Step Q12. Upon receiving the confirmation, the terminal 2 terminates the process of connecting itself to the server 1. The process then returns.

As shown in FIG. 13, the data-processing apparatus 4 performs a process of providing a processed sample. This process is different from the processed-sample providing process shown in FIGS. 4 to 9, in that the data-processing apparatus 4 performs the function of the terminal 2. In any other respects, the process is identical to the process shown in FIGS. 4 to 9 and will not be described in detail.

In Step Q05, the process of purchasing an image will be carried out. This process differs from the process shown in FIG. 10 or 11, in that the data-processing apparatus 4 performs the function of the terminal 2. In any other respects, the process is identical to the process shown in FIG. 10 or 11 and will not be described in detail.

In the image-processing method according to the second embodiment, the terminal 2 transmits a photographed image to the server 1, and the server 1 transmits image-registration data to the data-processing apparatus 4. The data-processing apparatus 4 performs the subsequent process in place of the terminal 2, in accordance with the image-registration data transmitted from the terminal 2.

It is therefore easier to operate the terminal 2. If the terminal 2 is used as a mobile device and if the data-processing apparatus 4 is used as a non-mobile device, the communications line 5 can be a line of a broader band than the communication line 3. This greatly shortens the time required to perform the process of purchasing images, i.e., Step S03.

The various functions explained in connection with the embodiments described above may be constituted by hardware. Alternatively, they may be constituted by software, or described in programs that can be read by computers. Further, each function may be constituted by software and hardware. In this case, either the software function or the hardware function is selected.

Moreover, the functions may be performed by loading programs into a computer from a recording medium (not shown). A recording medium according to this invention may be of any computer-readable medium that can record programs in any format.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image-processing method to be performed in a server that can communicate with a terminal device, characterized by comprising:

receiving an original image from the terminal device;

storing image-identifying data identifying the original image, in association with the original image;

transmitting the image-identifying data to the source from which the original image has been transmitted;

receiving a sample-image request from the terminal device;

performing a prescribed process on the original image, in response to the sample-image request;

forming sample images from an image generated by performing the prescribed process, the sample images being smaller than the original image;

storing process-identifying data identifying the process performed on the original image, in association with the original image;

transmitting the sample images and the process-identifying data to the terminal device;

receiving, from the terminal device, an image-process request including the image-identifying data and the process-identifying data; and transmitting an image generated by performing a process on the original image identified by the image-identifying data, the process being one identified by the process-identifying data.

2. The image-processing method according to claim 1, wherein the forming of sample images comprises:

analyzing the original image;

automatically designating a region in the original image in accordance with results obtained by analyzing the original image;

performing the process on that part of the original image which exits in the region designated; and setting an image of the part of the original image and an image generated by performing the process on the part of the original image, as the sample images.

3. The image-processing method according to claim 1, wherein the forming of sample images comprises:

analyzing the original image;

performing the process on the original image in accordance with results obtained by analyzing the original image; and setting, as the sample image, an image obtained by reducing the original image and an image obtained by reducing the image generated by performing the process, or a part extracted from the original image and a part extracted from the image generated by performing the process.

4. The image-processing method according to claim 3, wherein the part is automatically extracted from the original image or the image generated by performing the process, in accordance with results obtained by analyzing the original image.

5. The image-processing method according to claim 1, wherein the image-process request received includes data for purchasing the image generated by performing the process, and purchase data showing that the process has been performed is stored.

6. The image-processing method according to claim 1, wherein the image-process request received includes an address designating a destination to which to transmit the image, in addition to the image-identifying data and the process-identifying data, and the image generated by performing the process is transmitted to the destination designated by the address.

7. The image-processing method according to claim 1, wherein the process performed on the original image includes at least one of brightness correction, color correction, sharpness correction and red-eye correction.

8. An image-processing apparatus capable of communicating with a terminal device, characterized by comprising:

an image-receiving unit that receives an original image from the terminal device;

an image-storing unit which stores image-identifying data identifying the original image, in association with the original image;

an image-identifying data transmitting unit which transmits the image-identifying data to the terminal device;

a sample-image request receiving unit which receives a sample-image request from the terminal device;

a sample-image forming unit which performs a prescribed process on the original image, in response to the sample-image request, and which forms sample images which are smaller than the original image;

a process-data storing unit which stores process-identifying data identifying the process performed on the original image, in association with the original image;

a sample-image transmitting unit which transmits the sample images and the process-identifying data to the terminal device;

an image-process request receiving unit which receives, from the terminal device, an image-process request including the image-identifying data and the process-identifying data; and a processed-image transmitting unit which transmits an image generated by performing a process on the original image identified by the image-identifying data, the process being one identified by the process-identifying data.

9. The image-processing apparatus according to claim 8, wherein the sample-image forming unit comprises:

an analyzing unit which analyzes the original image;

a region-designating unit which automatically designates a region in the original image in accordance with results obtained by analyzing the original image;

an image-processing unit which performs the process on that part of the original image which exits in the region designated; and a sample-image setting unit which sets an image of the part of the original image and an image generated by performing the process on the part of the original image, as the sample images.

10. The image-processing apparatus according to claim 8, wherein the sample-image forming unit comprises:

an analyzing unit which analyzes the original image;

an image-processing unit which performs the process on the original image in accordance with results obtained by analyzing the original image; and a sample-image setting unit which sets, as the sample image, an image obtained by reducing the original image and an image obtained by reducing the image generated by performing the process, or a part extracted from the original image and a part extracted from the image generated by performing the process.

11. The image-processing apparatus according to claim 10, wherein the part is automatically extracted from the original image or the image generated by performing the process, in accordance with results obtained by analyzing the original image.

12. The image-processing apparatus according to claim 8, wherein the image-process request received by the image-process request receiving unit is a request for purchasing the image generated by performing the process, and a purchase-data recoding unit is provided, which records the purchase data showing that the process has been performed.

13. The image-processing apparatus according to claim 8, wherein the image-process request received by the image-process request receiving unit includes an address designating a destination to which to transmit the image, in addition to the image-identifying data and the process-identifying data, and a processed-image transmitting unit is provided, which transmits the image generated by performing the process to the destination designated by the address.

14. The image-processing apparatus according to claim 8, wherein the process performed on the original image by the sample-image forming unit includes at least one of brightness correction, color correction, sharpness correction and red-eye correction.

15. A computer-readable medium loaded with an image-processing program to be executed in an image-processing apparatus that can communicate with a terminal device, said program causing a computer to perform the following processes:

a process of receiving an original image from the terminal device;

a process of storing image-identifying data identifying the original image, in association with the original image;

a process of transmitting the image-identifying data to the source from which the original image has been transmitted;

a process of receiving a sample-image request from the terminal device;

a process of performing a prescribed process on the original image, in response to the sample-image request;

a process of forming sample images from an image generated by performing the prescribed process, the sample images being smaller than the original image;

a process of storing process-identifying data identifying the process performed on the original image, in association with the original image;

a process of transmitting the sample images and the process-identifying data to the terminal device;

a process of receiving, from the terminal device, an image-process request including the image-identifying data and the process-identifying data; and a process of transmitting an image generated by performing a process on the original image identified by the image-identifying data, the process being one identified by the process-identifying data.

16. The computer-readable medium according to claim 15, wherein the process of forming sample images comprises:

a process of analyzing the original image;

a process of automatically designating a region in the original image in accordance with results obtained by analyzing the original image;

a process of performing the process on that part of the original image which exits in the region designated; and a process of setting an image of the part of the original image and an image generated by performing the process on the part of the original image, as the sample images.

17. The computer-readable medium according to claim 15, wherein the process of forming sample images comprises:

a process of analyzing the original image;

a process of performing the process on the original image in accordance with results obtained by analyzing the original image; and a process of setting, as the sample image, an image obtained by reducing the original image and an image obtained by reducing the image generated by performing the process, or a part extracted from the original image and a part extracted from the image generated by performing the process.

18. The computer-readable medium according to claim 17, wherein the process of forming sample images comprises:

the part is automatically extracted from the original image or the image generated by performing the process, in accordance with results obtained by analyzing the original image.

19. The computer-readable medium according to claim 15, wherein the image-process request received in the process of receiving a image-process request is a request for purchasing the image generated by performing the process, and the computer is caused to record data showing that the process has been performed.

20. The computer-readable medium according to claim 15, wherein the image-process request received in the process of receiving an image-process request includes an address designating a destination to which to transmit the image, in addition to the image-identifying data and the process-identifying data, and the computer is caused to transmit the image generated by performing the process to the destination designated by the address.

21. The computer-readable medium according to claim 15, wherein the process performed on the original image in the process of forming sample images includes at least one of brightness correction, color correction, sharpness correction and red-eye correction.

* * * * *